(12) United States Patent
Kuno et al.

(10) Patent No.: US 6,473,628 B1
(45) Date of Patent: Oct. 29, 2002

(54) TELEPHONE SET

(75) Inventors: Hidehiko Kuno, Tottori (JP); Junko Nagatani, Tottori (JP)

(73) Assignees: Sanyo Electric Co., Ltd., Osaka-fu (JP); Tottori Sanyo Electric Co., Ltd., Tottori-ken (JP)

( * ) Notice: Subject to any disclaimer, the term of this patent is extended or adjusted under 35 U.S.C. 154(b) by 0 days.

(21) Appl. No.: 09/179,664

(22) Filed: Oct. 27, 1998

(30) Foreign Application Priority Data

| Oct. 31, 1997 | (JP) | ............................................ 9-300555 |
| Nov. 5, 1997  | (JP) | ............................................ 9-302599 |
| Nov. 6, 1997  | (JP) | ............................................ 9-304181 |
| May 12, 1998  | (JP) | ........................................... 10-128845 |

(51) Int. Cl.[7] .............................. H04B 1/38; H04M 1/00
(52) U.S. Cl. ........................ 455/566; 455/575; 455/550
(58) Field of Search ................................ 455/566, 575, 455/226.1, 266.4, 226.2, 550

(56) References Cited

U.S. PATENT DOCUMENTS 5,870,683 A * 2/1999 Wells .......................... 455/566
5,950,139 A * 9/1999 Korycan ...................... 455/566

FOREIGN PATENT DOCUMENTS

| JP | 07202994 A | 8/1995 |
| JP | 08237393 A | 9/1996 |

* cited by examiner

Primary Examiner—Vivian Chin
Assistant Examiner—James K Moore
(74) Attorney, Agent, or Firm—Akin, Gump, Strauss, Hauer & Feld, L.L.P.

(57) ABSTRACT

A telephone set automatically switches between displaying telephone communication information and displaying images on a display panel of the telephone set. The telephone communication information indicates whether the telephone set is within range of a base station. At the end of a call, or when power is first switched on, the display panel of the telephone set displays telephone communication information when the telephone set enters a standby mode to wait for a call to arrive. After the telephone set remains in the standby mode for a predetermined period of time (e.g., five minutes) without receiving a call or input from an input unit (e.g., keypad) on the telephone set, images unrelated to telephone communication are displayed on the display panel of the telephone set for the user's amusement. The telephone communication information is then presented by an indicator circuit of the telephone set instead of the display panel.

5 Claims, 14 Drawing Sheets

FIG. 2

| V | 1ST MODE | | 2ND MODE |
|---|---|---|---|
| | 1ST LOUDSPEAKER | MICROPHONE | 2ND LOUDSPEAKER |
| 1 | VERY SOFT | HIGH | — |
| 2 | SOFT | MEDIUM | SOFT |
| 3 | MEDIUM | MEDIUM | MEDIUM |
| 4 | LOUD | MEDIUM | LOUD |
| 5 | VERY LOUD | MEDIUM | — |

FIG. 6

|  | NORMAL MODE | | NOISY MODE | HUSH MODE |
| --- | --- | --- | --- | --- |
|  | RANGE | INIT. | | |
| LOUDSPEAKER VOLUME | SOFT/MEDIUM/LOUD | MEDIUM | VERY LOUD | — |
| MICROPHONE SENSITIVITY | OFF/LOW/MEDIUM/HIGH | MEDIUM | — | VERY HIGH |
| RINGER VOLUME | OFF/SOFT/MEDIUM/LOUD | MEDIUM | VERY LOUD | OFF |
| VIBRATOR | ON/OFF | OFF | ON | ON |
| CLICK TONE | ON/OFF | ON | — | OFF |

TELEPHONE SET

BACKGROUND OF THE INVENTION

The present invention relates to a telephone set, in particular to a portable telephone set.

Battery-operated portable wireless telephone sets ranging from vehicular models to pocketsize sets have come into common use. Many portable telephone sets have functions not found in wired telephone sets. A simple example is a power switch enabling the telephone set to be switched off when calls are not expected, to conserve battery power.

Another feature is a volume control that can adjust the loudspeaker volume for use in various environments. Many portable telephone sets store the volume setting in a non-volatile memory while power is switched off, and restore the same setting the next time power is switched on, so that the user does not have to adjust the volume every time the telephone set's power is switched on.

Many portable telephone sets also have an expanded range of loudspeaker volume settings, including very soft and very loud settings. The very soft setting is used to avoid disturbing people nearby, or to avoid having a telephone conversation overheard. The very loud setting is used in noisy environments, to make the distant party's voice audible.

Another function found in many portable telephone sets is a vibration function that alerts the user to arriving calls by means of a vibrator. This function is useful in noisy environments, and in situations in which the user does not want to disturb people nearby.

Yet another function is a selection of different types of ringing tones, as taught in Japanese Unexamined Patent Publication No. 202994/1995. This function enables the user to distinguish the ringing tone of his or her telephone set from the ringing tones of other nearby telephone sets.

Still another function is a selection of hold melodies and other sound effects, sometimes including loud non-musical sound effects that can be used to discourage malicious callers.

A further function is a small liquid-crystal display panel that displays the time, date, telephone numbers, battery status, short messages, and other relevant information.

A still further function, taught in Japanese Unexamined Patent Publication No. 237393/1996, is an interface enabling the telephone set to be connected to a television set, so that the above information, and possibly other information such as images, not necessarily relevant to telephone communication, can be displayed on a large screen.

Although useful, these functions also make the telephone set more complex and more difficult to operate, and invite various types of operation mistakes. For example, if the user selects the very loud volume setting while using the telephone set in a noisy environment, and forgets to reset the volume when the call is finished, a later call in a more quiet environment may startle the user or people nearby. If the user selects the very soft volume while using the telephone set during a meeting, and forgets to reset the volume, a later call in a different environment may be difficult to hear, requiring a hasty readjustment of the volume.

Many telephone sets have a first loudspeaker for use when held close to the ear, and a second loudspeaker for use at a distance from the ear. The very soft and very loud volume settings are useful with the first loudspeaker, but if these settings are transferred inadvertently to the second loudspeaker, the distant party's voice becomes barely audible or disturbingly loud.

Selection of the vibration function is troublesome because the user must also decide whether to enable or disable the ringer, and whether to increase or decrease the microphone sensitivity, these decisions depending on whether the vibration function is used in a quiet or noisy environment. The user is required to make multiple settings for each situation.

The utility of a selection of different ringing tones is limited, because these ringing tones tend to sound alike. Identification of a particular ringing tone can be especially difficult when the telephone is carried in a purse or briefcase, or in an inner pocket under heavy clothing.

The utility of sound effects in discouraging malicious callers is offset by the misuse of the same sound effects to originate malicious calls.

The utility of a display of the date and time is limited because a person using a portable telephone set is likely to be wearing a wristwatch that gives the date and time more conveniently. Furthermore, the generally drab displays found on conventional portable telephone sets compare unfavorably with the attractive and fashionable dial faces of wristwatches. In addition, the display of fixed information such as telephone numbers during standby periods is uninteresting, and may give the false impression that the telephone set is malfunctioning, because the information does not change.

Connection of a portable telephone set to a television set quickly drains the battery of the telephone set, thereby lessening the utility of the telephone set for communication purposes.

Thus for various reasons, conventional portable telephone sets are somewhat difficult to operate, and their sound effects and display functions are not as useful as might be desired.

SUMMARY OF THE INVENTION

In a preferred embodiment of the present invention, a telephone set includes a receiving circuit, a display panel, and an input unit with manual controls. The memory unit stores a plurality of images. A control unit monitors elapsed time and input from the input unit. The control unit selects the images from the memory unit, displays the images on the display panel, and automatically switches the display panel from displaying the images to displaying information when a call is received by the telephone set. The images are automatically displayed after a predetermined time period has elapsed, during which the telephone set has entered and remained in a standby state waiting for a call to arrive, without an input from the input unit. While displaying the images, the display panel also displays an indication of whether the telephone set is within communicable range of a base station.

In an alternate embodiment of the present invention, a telephone set includes a display panel, a memory unit, an indicator circuit and a control unit. The memory unit stores a plurality of images. The indicator circuit operates independent of the display panel. The control unit selects the images from the memory unit, displays the images on the display panel, and automatically switches the display panel from displaying the images to displaying information when a call is received by the telephone set. Telephone communication information is presented by the indicator circuit when the images are displayed, and the telephone communication information is presented by the display panel when the images are not displayed.

In yet another embodiment of the present invention, the control unit automatically switches the display panel from displaying information to displaying the images a predetermined time after the telephone set enters a standby mode.

BRIEF DESCRIPTION OF THE SEVERAL VIEWS OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the attached drawings:

FIG. 2 is a chart of microphone sensitivity and loudspeaker volume settings;

FIG. 6 is a chart of vibrating settings and other settings;

DETAILED DESCRIPTION OF THE INVENTION

Embodiments of the invention will be described with reference to the attached illustrative drawings. The embodiments are portable telephone sets of the type used in the Japanese Personal Handyphone System (PHS), for example, to communicate with a public telephone network through a public base station or cell station, or through a private base station in a home or office, or to communicate directly with another portable telephone set of the same type.

The Personal Handyphone System is a time-division multiple access (TDMA) system employing time-division duplex (TDD) communication, quaternary phase-shift keying (QPSK), and adaptive differential pulse code modulation (ADPCM). One of the components of the embodiments below is a channel and voice coder-decoder or codec, which is an integrated circuit comprising a channel codec and a voice codec. The channel codec performs QPSK modulation and demodulation, TDMA/TDD multiplexing and demultiplexing, and other functions such as the calculation of a cyclic redundancy check (CRC) code. The voice codec performs ADPCM coding and decoding functions, including compression, expansion, analogto-digital conversion, and digital-to-analog conversion.

Each of the embodiments below also has a receiver that receives wireless signals through an antenna, and a transmitter that transmits wireless signals through the same antenna. A phase-locked loop (PLL) provides signals of selectable frequencies to the receiver and transmitter. During a telephone call, the receiver uses the signal from the PLL to down-convert the frequency of the received wireless signal, and supplies the down-converted signal to the above-described channel and voice codec, which converts the received signal to an analog voice signal. The analog voice signal is normally reproduced through a loudspeaker held close to the user's ear. The user speaks into a microphone, producing an analog voice signal that is coded and modulated onto a carrier signal by the channel and voice codec, then transmitted by the transmitter. The received and transmitted analog voice signals are amplified by respective amplifiers.

Figure 1:
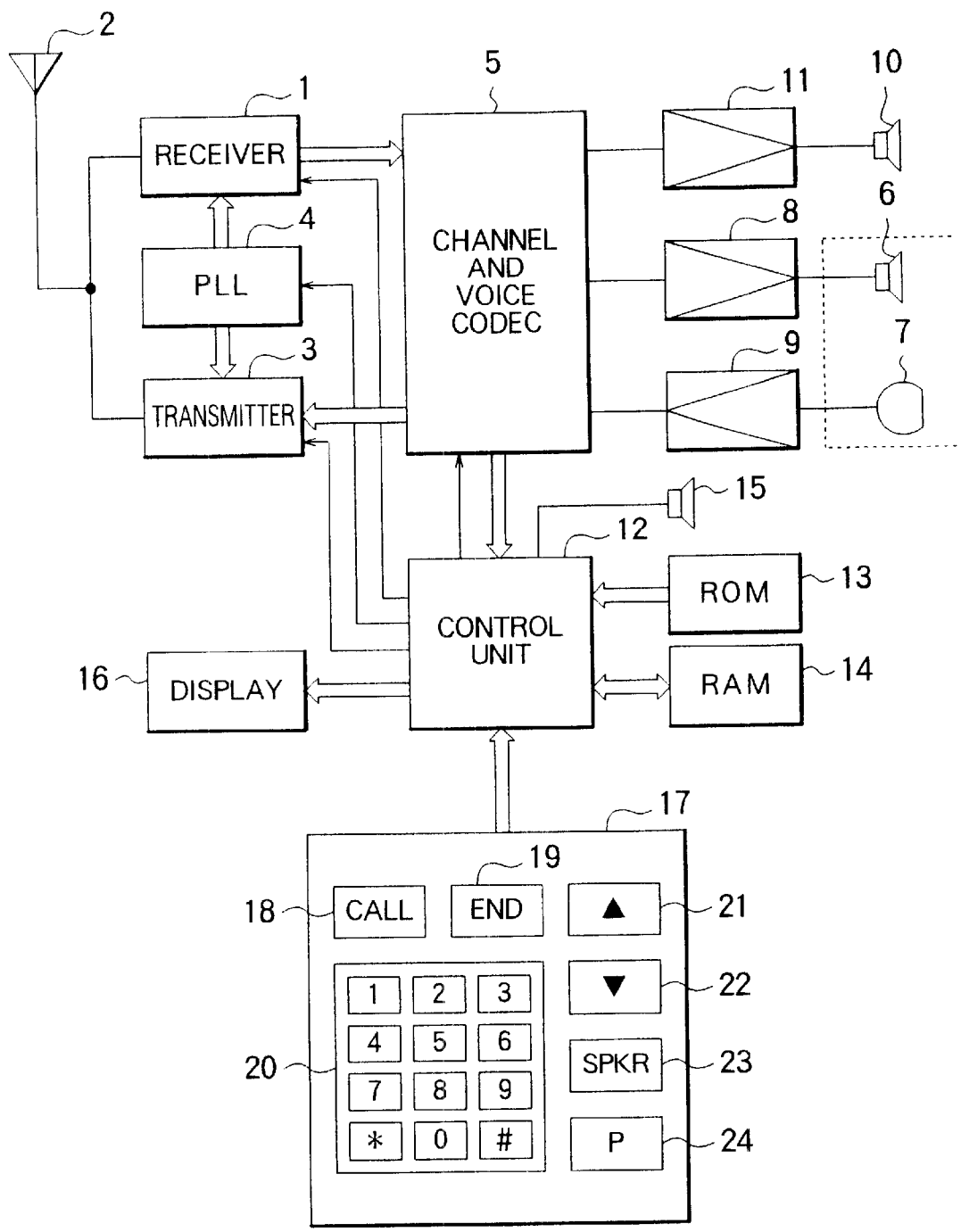
FIG. 1 is a block diagram illustrating a first embodiment of the invention.

Referring to FIG. 1, the first embodiment is a portable telephone set comprising a receiver 1, antenna 2, transmitter 3, PLL 4, channel and voice codec 5, loudspeaker 6, microphone 7, and amplifiers 8 and 9 as described above. Loudspeaker 6 will be referred to as the first loudspeaker. The first embodiment also has a second loudspeaker 10 for use at a distance from the user's ear, and a more powerful amplifier 11 that amplifies the received signal when the second loudspeaker 10 is used. The telephone set may also have a second microphone (not visible) for use with the second loudspeaker 10.

A control unit 12 such as a microprocessor controls the telephone set by executing a control program stored in a read-only memory (ROM) 13. The control unit 12 includes an internal timer (not visible). A random-access memory (RAM) 14 stores volume settings and other information needed by the control unit 12. A ringer 15 generates a ringing tone to inform the user of arriving calls. A liquid-crystal display panel 16 displays telephone numbers and other information.

The telephone set has an input unit 17 with various manual control buttons and keys, including a call button 18 for originating and answering calls, an end button 19 for terminating calls, a dial keypad 20 for entering telephone numbers, two volume control buttons 21 and 22, a speaker (SPKR) button 23 that selects the first loudspeaker 6 or second loudspeaker 10, and a power (P) on-off button 24. The volume control buttons will also be referred to as the up button 21 and down button 22.

Next the operation of the first embodiment will be described. The description will be confined to operations related to volume control.

The telephone set operates in two modes, depending on which loudspeaker is selected. When a call is originated or answered, the telephone set operates initially in the first mode, using the first loudspeaker 6. To select the second mode and use the second loudspeaker 10, the user must press the speaker button 23.

In the first mode, the user can use the volume control buttons 21 and 22 to set the loudspeaker volume in a five-step range, the five settings being very soft, soft, medium, loud, and very loud. Pressing the up button 21 increases the volume. Pressing the down button 22 decreases the volume. In the second mode, the volume control buttons 21 and 22 operate in a three-step subrange with only the soft, medium, and loud settings.

The control unit 12 expresses the volume setting by means of a variable V as shown in FIG. 2, values of V from one to five designating volume settings from very soft to very loud. The control unit 12 sets the value of V in an internal register (not visible) and controls the channel and voice codec 5 so that received voice signals are reproduced at the designated volume level. When the user selects the very soft setting (V=1), the control unit 12 also causes the channel and voice codec 5 to increase the encoded volume of the transmitted voice signal, thereby increasing the microphone sensitivity, because the user is presumably speaking softly to avoid disturbing people nearby, or to avoid being overheard.

When power is switched off by the power button 24, the control unit 12 stores a value of V in the RAM 14. The RAM 14 is backed up by the telephone set's battery so that the memory contents are retained even while power is off The value originally stored in the RAM 14 when the telephone set is manufactured is three (V=3).

Figure 3:
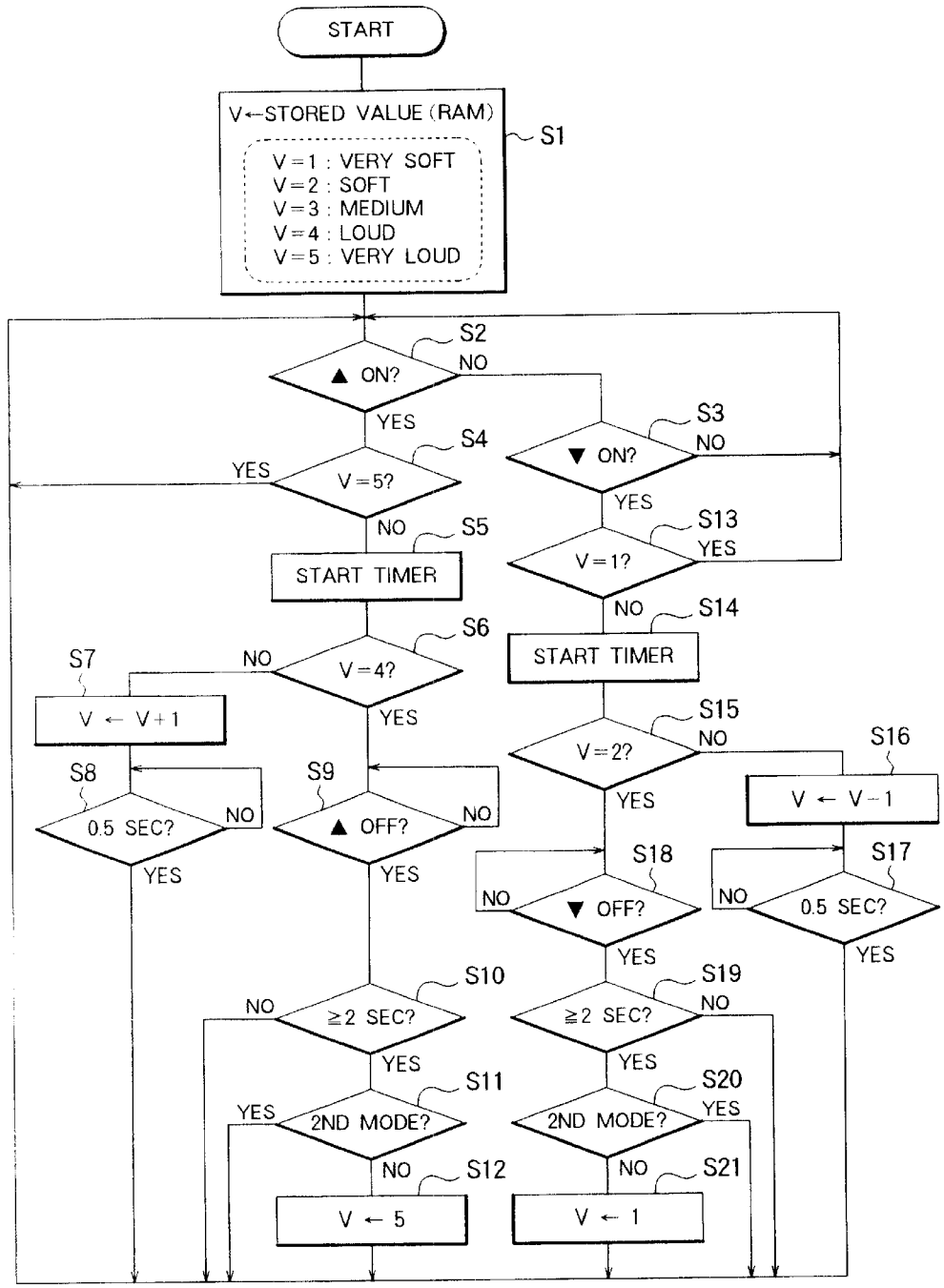
FIG. 3 is a flowchart illustrating the volume setting operation of the first embodiment.

When power is switched on, the control unit 12 controls the loudspeaker volume according to the flowchart in FIG. 3. Initially, the control unit 12 reads the value of V from the RAM 14 (step S1), and operates according to the stored volume setting. The control unit 12 also monitors the volume control buttons (steps S2 and S3).

If the up button 21 is pressed, giving a yes (Y) result in step S2, the control unit 12 determines whether the current value of V is equal to five (step S4). If so, the control unit 12 ignores the input from the up button 21 and returns to step S2. If not, the control unit 12 starts its internal timer (step S5), and determines whether V is equal to four (step S6). If V is not equal to four, the control unit 12 increments V (step S7) to increase the volume setting, waits for half a second (step S8), then returns to step S2.

If V is equal to four, the control unit 12 waits for the up button 21 to be released (step S9), then determines from the timer value whether the up button was pressed for at least two seconds (step S10). If not, the control unit 12 returns to step S2. If so, the control unit 12 determines whether the second mode, using the second loudspeaker 10, is currently selected (step S11), and returns to step S2 if it is. If the present mode is the first mode, the control unit 12 sets V to five (step S12) to select the very loud volume setting, then returns to step S2.

Similar operations are performed when the down button 22 is pressed. After recognizing the button-press in step S3, the control unit 12 determines whether V is equal to one (step S13), and returns to step S2 if this is the case. If V is greater than one, the control unit 12 starts the timer (step S14) and determines whether V is equal to two (step S15). If V is not equal to two, the control unit 12 decrements V (step S16), waits for half a second (step S17), then returns to step S2. If V is equal to two, the control unit 12 waits for the down button 22 to be released (step S18), determines whether the down button was pressed for at least two seconds (step S19), and determines whether the first or second mode is currently selected (step S20). If the down button 22 was not pressed for at least two seconds, or if the second mode is selected, the control unit 12 returns to step S2. If the down button 22 was pressed for at least two seconds and the first mode is selected, the control unit 12 sets V to one (step S21) to select the very soft volume setting, then returns to step S2.

When, for example, V is equal to three and the first mode is selected, if the down button 22 is pressed for three seconds, the control unit 12 uses a small fraction of the first second to execute steps S2, S3, S13, S14, S15, and S16, reducing V to two. After waiting for half a second in step S17, the control unit 12 executes steps S2, S3, S13, S14, S15, and S18 in approximately 2.5 seconds, then executes steps S19, S20, and S21, reducing V to one.

The procedure in FIG. 3 allows the full range of V settings from one to five to be selected in the first mode, but restricts V to the subrange from two to four in the second mode, thereby preventing the very soft and very loud volume settings from being used with the second loudspeaker 10, for which these two settings are inappropriate. This procedure also allows the same two volume control buttons 21 and 22 to control the volume of both loudspeakers 6 and 10, an advantage in a small telephone set without space for many buttons, and an advantage to the user because the volume control operations are easy to learn.

Figure 4:
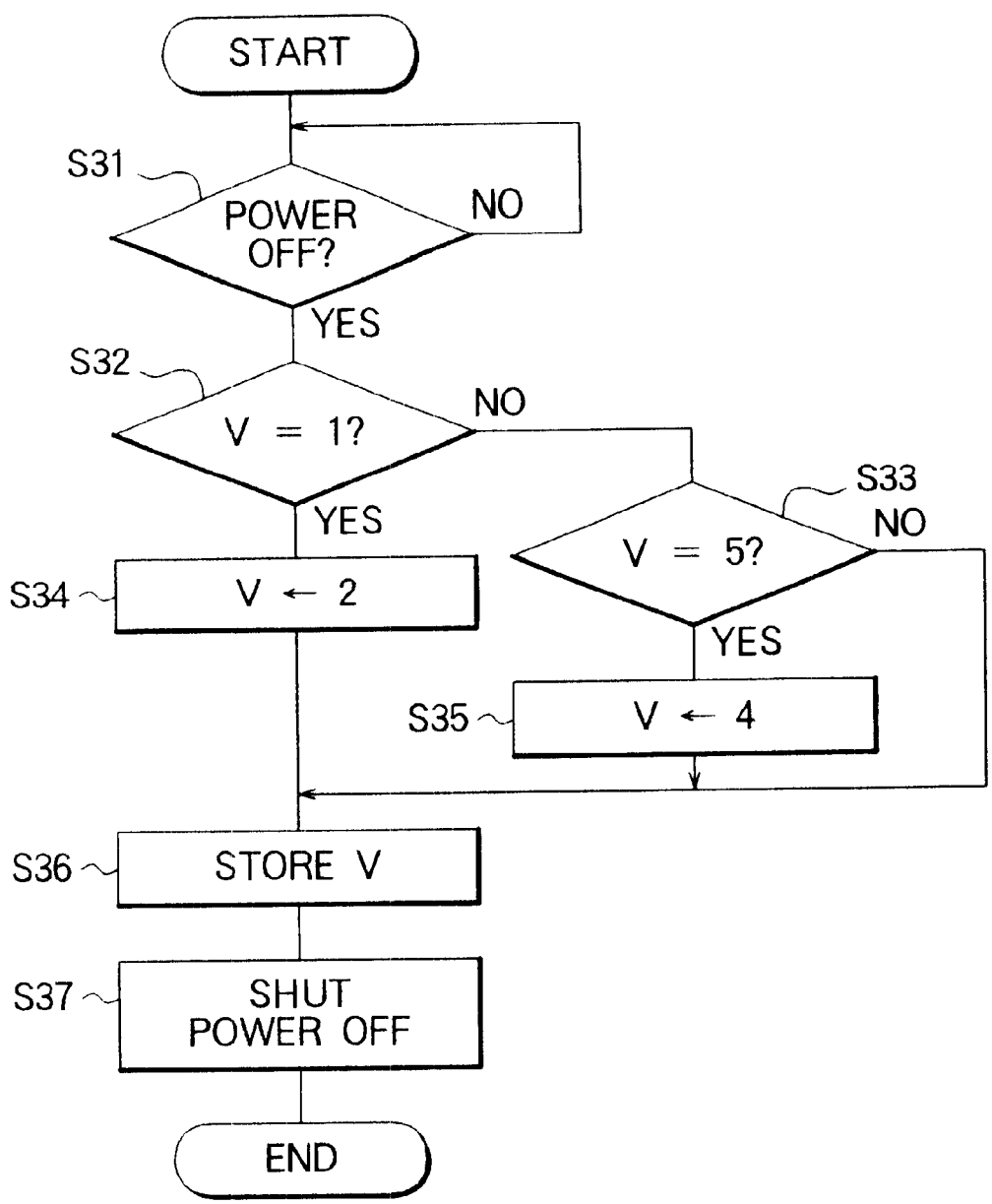
FIG. 4 is a flowchart illustrating the storing of volume settings at power-off.

FIG. 4 shows the procedure followed when power is switched off. The control unit 12 monitors the power button 24 (step S31). When the power button 24 is pressed, the control unit 12 tests the value of V (steps S32 and S33). If V is equal to one, the control unit 12 changes V to two (step S34). If V is equal to five, the control unit 12 changes V to four (step S35). The value of V is then stored in the RAM 14 (step S36), after which power is shut off (step S37). The stored value will be read by the control unit 12 the next time power is switched on.

The procedure in FIG. 4 prevents the very soft and very loud volume settings from being stored in the RAM 14 while power is off Thus, regardless of how the telephone set was used previously, when its power is switched on, the initial volume setting is neither inaudibly soft nor disturbingly loud.

In a variation of the first embodiment, the range of volume settings available in the first mode is an arbitrary range, not necessarily limited to five steps. In the second mode, the volume settings are restricted to a first subrange of this range. When power is switched off, the volume setting stored in the RAM 14 is restricted to a second subrange, which need not be identical to the first subrange. If the setting is not in the second subrange when power is switched off, the closest setting in the second subrange is stored.

Next, a second embodiment will be described.

Figure 5:
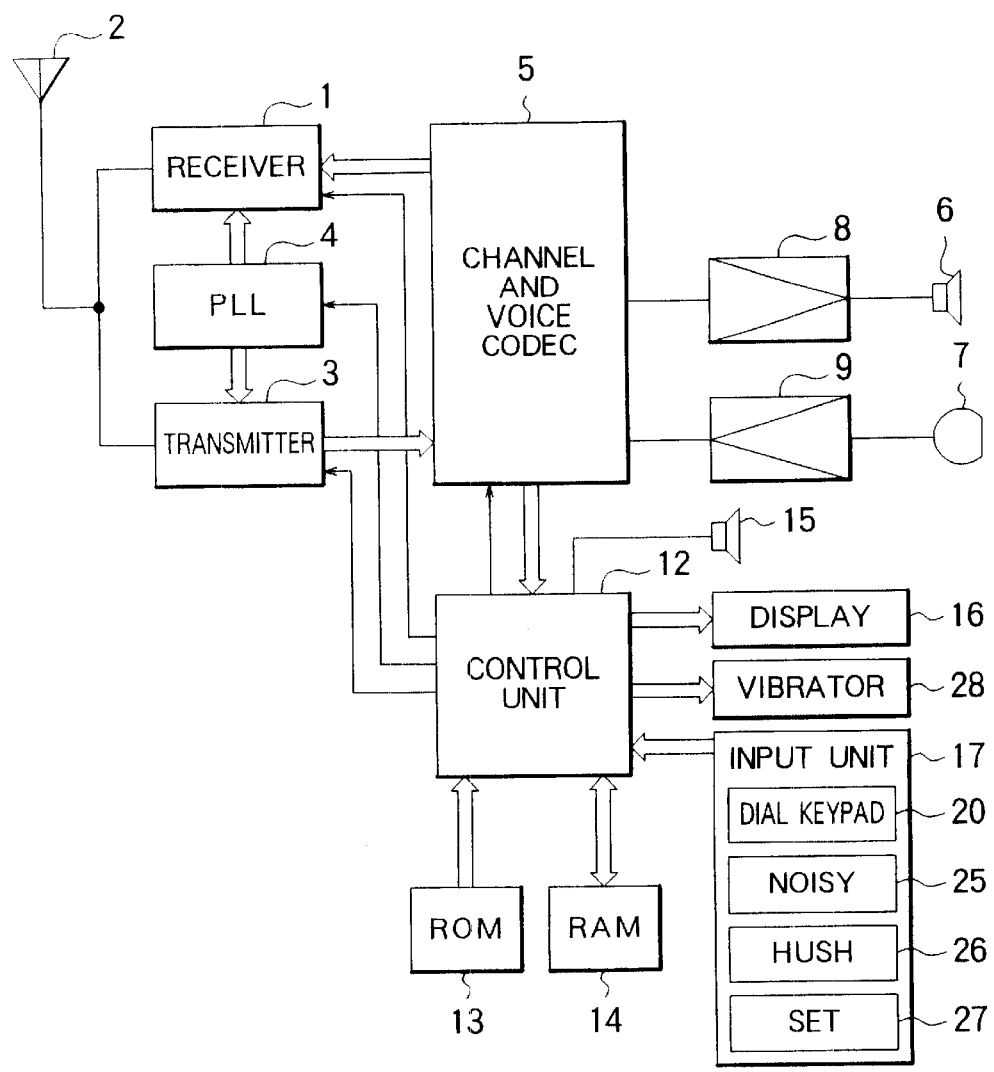
FIG. 5 is a block diagram illustrating a second embodiment of the invention.

Referring to FIG. 5, the second embodiment is a portable telephone set comprising a receiver 1, antenna 2, transmitter 3, PLL 4, channel and voice codec 5, loudspeaker 6, microphone 7, and amplifiers 8 and 9 as described above. A second loudspeaker (not visible) may be provided for use at a distance from the ear.

The second embodiment also has a control unit 12, comprising a microprocessor or the like, coupled to a read-only memory (ROM) 13 storing a control program, a random-access memory (RAM) 14 storing mode settings and various other data, a ringer 15 that generates ringing tones to announce arriving calls, a liquid-crystal display panel 16 displaying various information, and an input unit 17 with various keys and buttons, including a dial keypad 20, a noisy mode button 25, a hush mode button 26, and a normal mode setting button 27. The telephone set can be set to emit a click tone when the buttons and keys in the input unit 17 are pressed. The control unit 12 is also coupled to a vibrator 28 that announces arriving calls by vibrating.

Next, the operation of the second embodiment will be described.

Referring to FIG. 6, the telephone set has a normal mode, a noisy mode, and a hush mode. In the normal mode, the loudspeaker volume, microphone sensitivity, and ringer volume can each be set in a three-step range (soft, medium, loud, or low, medium, high), the initial setting being medium in each case. The microphone 7 and ringer 15 can also be switched off. The vibrator 28 and click tone can be switched on or off; that is, they can be enabled or disabled. Initially, the vibrator 28 is switched off and the click tone is switched on. The initial settings are stored in the ROM 13.

In the noisy mode, the loudspeaker volume and ringer volume are set to a very loud level, and the vibrator 28 is enabled, so that arriving calls will be announced by both the ringer 15 and vibrator 28. The microphone sensitivity is left unchanged, and the click-tone setting is left unchanged. The noisy mode is useful in noisy environments.

In the hush mode, the loudspeaker volume is left unchanged, but the microphone sensitivity is increased to a very high level, so that the user can speak in a hushed voice. The ringer 15 is switched off, the vibrator 28 is enabled, and the click tone is switched off. Arriving calls will be announced only by the vibrator. This mode is useful when the user does not want to disturb people nearby, or does not want to be overheard.

Figure 7:
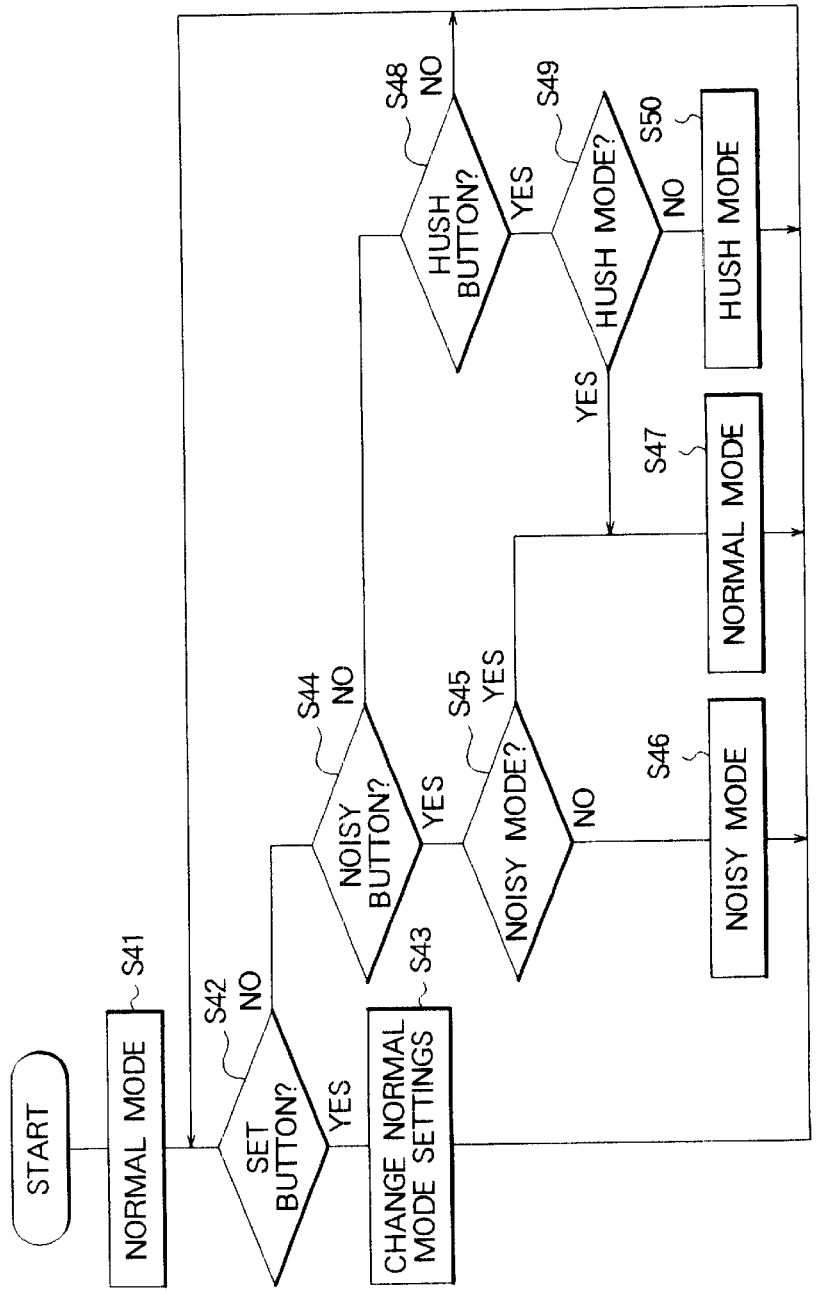
FIG. 7 is a flowchart illustrating the operation of the second embodiment.

Referring to FIG. 7, the control unit 12 starts operating in the normal mode with the initial settings (step S41). If the normal mode setting button 27 is pressed (Y in step S42), the control unit 12 displays a setting menu on the display panel 16, and the user uses the dial keypad 20 to select desired settings (step S43). The selected settings are stored in the RAM 14.

When the noisy mode button 25 is pressed (Y in step S44), then if the present mode is not the noisy mode (N in step S45), the control unit 12 changes the loudspeaker, ringer, and vibrator settings to the noisy-mode values indicated in FIG. 6 (step S46). If the present mode is the noisy mode (Y in step S45), the control unit 12 restores the normal settings from the RAM 14 (step S47).

When the hush mode button 26 is pressed (Y in step S48), if the present mode is not the hush mode (N in step S49), the control unit 12 changes the microphone sensitivity, ringer, and vibrator settings to the hush-mode values indicated in FIG. 6 (step S50). If the present mode is the hush mode (Y in step S49), the control unit 12 restores the normal settings from the RAM 14 (step S47).

By pressing the noisy mode button 25 or hush mode button 26 before or during a call, the user can instantly make all of the settings needed to use the telephone set in a noisy environment, or an environment in which the user does not wish to disturb or be overheard by people nearby. By pressing the same button once more, the user can instantly return to the normal mode. The telephone set thus becomes easy to operate.

By pressing the normal mode setting button 27 in the noisy mode or hush mode, the user can change one or more of the settings that were made collectively by pressing the noisy mode button 25 or hush mode button 26.

In a variation of the second embodiment, the loudspeaker volume and ringer volume are set to the loud level in the noisy mode, instead of being set to a very loud level. Similarly, in the hush mode, the microphone sensitivity may be set to the high level, instead of the very high level, and the ringer 15 may be set to the soft volume level, instead of being switched off. The click tone setting may be left unchanged in the hush mode.

In another variation, on return from the noisy mode or hush mode to the normal mode, the control unit 12 restores some or all of the initial settings from the ROM 13, instead of restoring the settings stored in the RAM 14.

Next, a third embodiment will be described.

Figure 8:
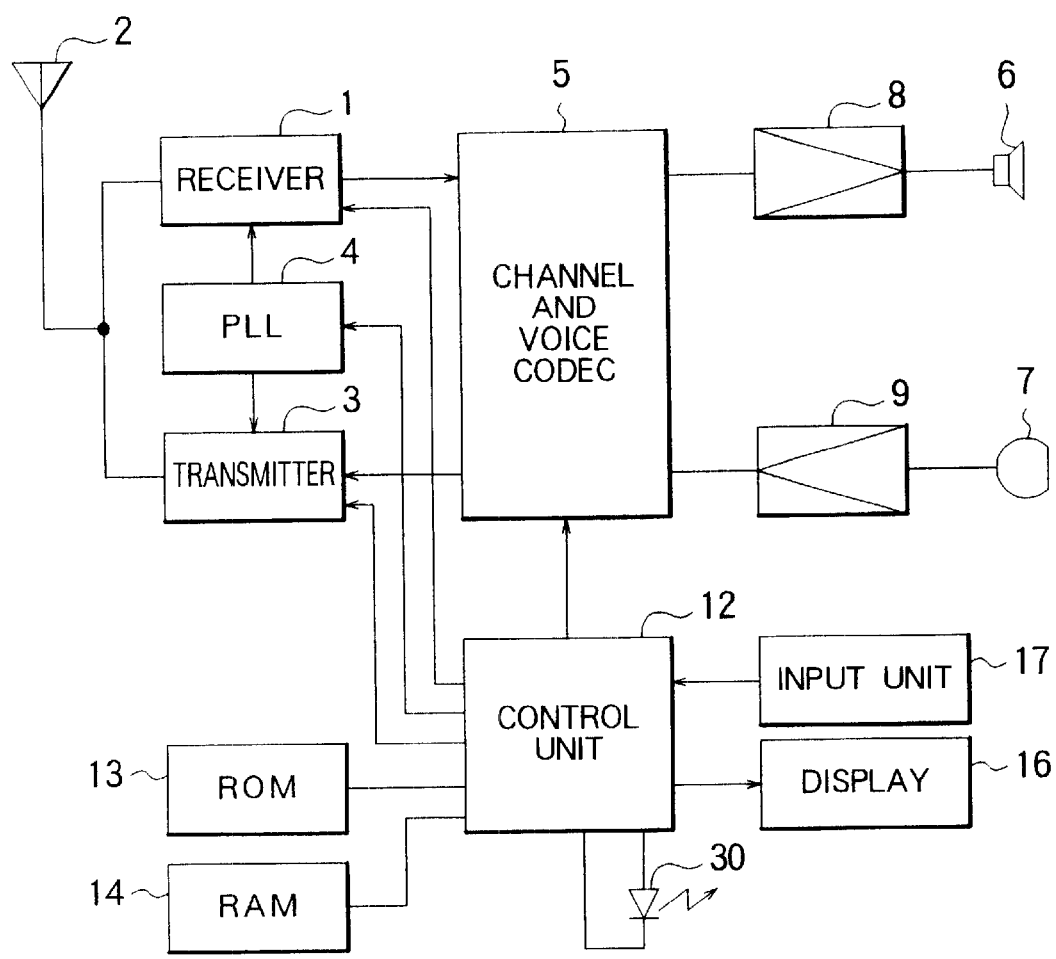
FIG. 8 is a block diagram illustrating a third embodiment of the invention.

Referring to FIG. 8, the third embodiment is a portable telephone set comprising a receiver 1, antenna 2, transmitter 3, PLL 4, channel and voice codec 5, loudspeaker 6, microphone 7, and amplifiers 8 and 9 as described above.

The third embodiment also has a control unit 12 coupled to a read-only memory (ROM) 13 storing a control program, a random-access memory (RAM) 14 storing mode settings and various other data, a liquid-crystal display panel 16, an input unit 17 with various manual control buttons and keys, and a light-emitting diode (LED) indicator 30.

Figure 9:
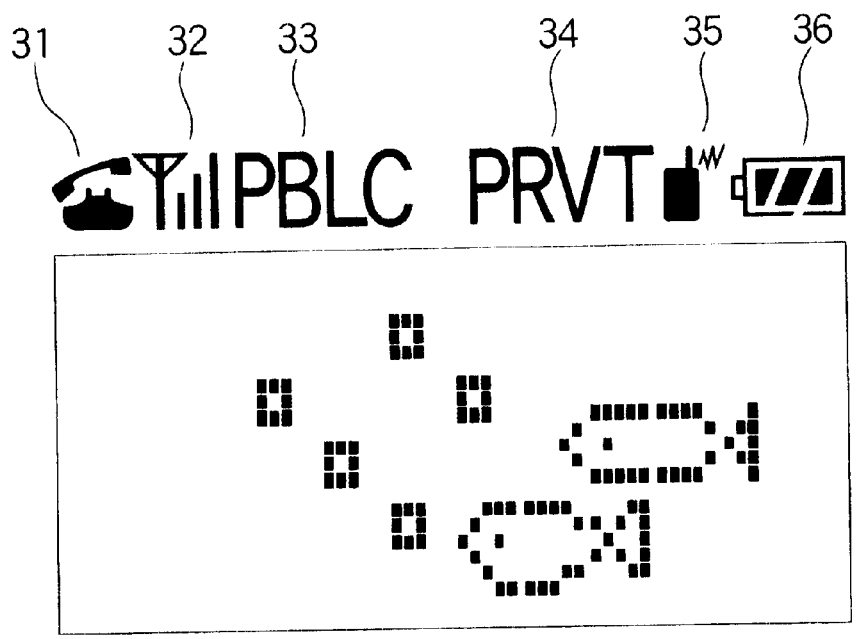
FIG. 9 illustrates the display panel in the third embodiment.

Referring to FIG. 9, the display panel 16 has a row of icons and abbreviations at the top. The telephone icon 31 indicates that a called party's telephone is ringing. The antenna icon 32 indicates electric field strength when the telephone set is within range of a base-station antenna. The abbreviation PBLC 33 indicates the mode for communication with a public base station. The abbreviation PRVT 34 indicates the mode for communication with a private base station. The transceiver icon 35 indicates the mode for direct communication with another portable telephone set. The battery icon 36 indicates remaining battery charge.

Below the row of icons is a dot-matrix portion of the display panel 16, providing space for the display of simple images, such as the swimming fish shown in the drawing, or for the display of three short lines of text.

Next, the operation of the third embodiment will be described.

Figure 10:
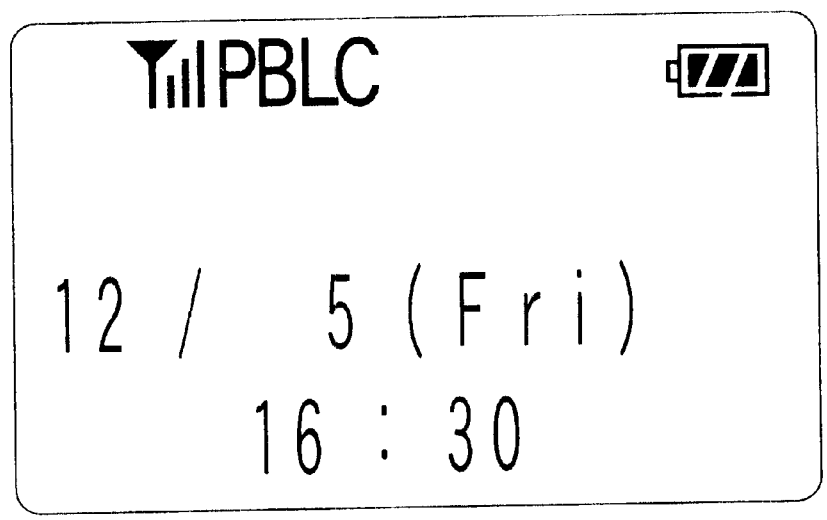
FIG. 10 illustrates a display of information on the display panel.
Figure 11A:
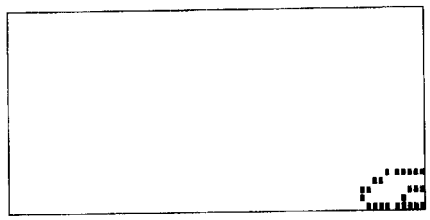
FIGS. 11A, 11B, 11C, 11D, 11E, 11F, and 11G illustrate a display of images on the display panel.
Figure 11B:
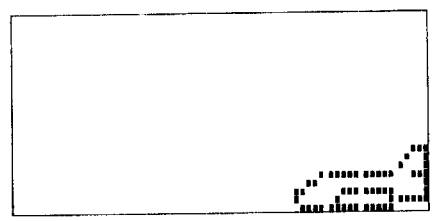
Figure 11C:
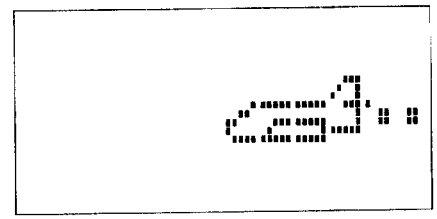
Figure 11D:
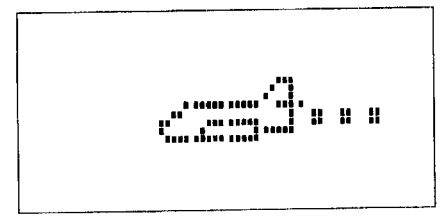
Figure 11E:
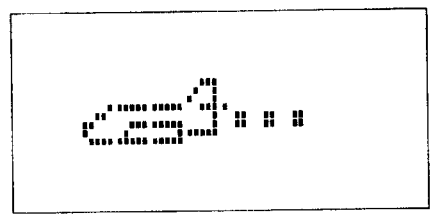
Figure 11F:
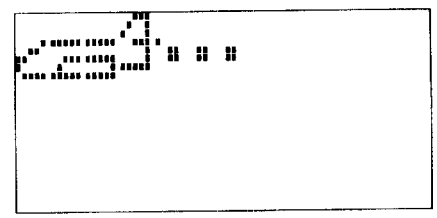
Figure 11G:
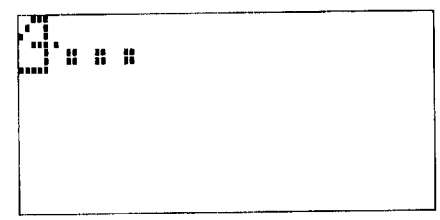

At the end of a call, or when power is first switched on, the telephone set enters a standby mode to wait for a call to arrive. For the first five minutes of standby, the control unit 12 displays the date and time on the display panel 16, together with the relevant icons and abbreviations, as shown in FIG. 10, for example.

If no call is received and no buttons or keys are pressed, after five minutes the control unit 12 automatically switches from the date-and-time display to an image display such as the swimming fish shown in FIG. 9. The image data for this display are stored in the ROM 13. The ROM 13 preferably stores several types of images: for example, an image of swimming fish, an image of a flying airplane, and an animal image such the head of a mole. The control unit 12 changes the image type from time to time, preferably in a pseudo-random sequence, or as a pseudo-random function of the time of day, so that the user does not know which type of image will appear next.

The control unit 12 also causes the images to move intermittently. The ROM 13 stores, for example, seven airplane images as shown in FIGS. 11A to 11G. The control unit 12 displays these images one after another, changing from one image to the next at intervals of ten seconds, for example, thus causing the airplane to move slowly across the display panel. Swimming fish can be made to move in the same way. A mole's head can be made to pop up at a random location on the display panel 16, give a sign of greeting, then sink down toward the bottom of the display panel and disappear.

The images can also be made to move by scrolling, but the necessary scrolling calculations consume power. To conserve battery charge, it is preferable to read pre-stored images intermittently from the ROM 13.

The display of these images does not affect the normal standby operation of the telephone set. During display of the images, however, the icons and abbreviations at the top of the display panel 16 are preferably turned off, because they distract attention from the image display. While the icons are turned off, the control unit 12 uses the LED indicator 30 to indicate whether the telephone set is within range of a base station.

The telephone set also has a battery saving mode, which is similar to the standby mode except that the receiver 1 is turned on only intermittently, at intervals synchronized with the transmission of paging information from a base station. The image display is also used in the battery saving mode, the images being displayed intermittently, at intervals synchronized with the intervals at which the receiver 1 is turned on.

When a call is received, or when the user presses one of the keys or buttons on the input unit 17, the control unit 12 automatically switches back from the image display to an information display such as the one in FIG. 10. Thus the image display in no way interferes with the normal operation of the telephone set.

By switching during standby from the uninteresting display of the date and time to the more amusing display of images, the third embodiment makes the telephone set more attractive to the user.

By switching from one type of image to another in a pseudo-random manner, the third embodiment avoids operating with boring predictability.

By causing the image to change from time to time, the third embodiment reassures the user that the telephone set is operating normally, particularly in the battery saving mode, in which the image display is synchronized with the operation of the receiver 1.

By using the LED indicator 30 during image display, the third embodiment continues to inform the user as to whether or not the telephone set is within range of a base station.

Figure 15:
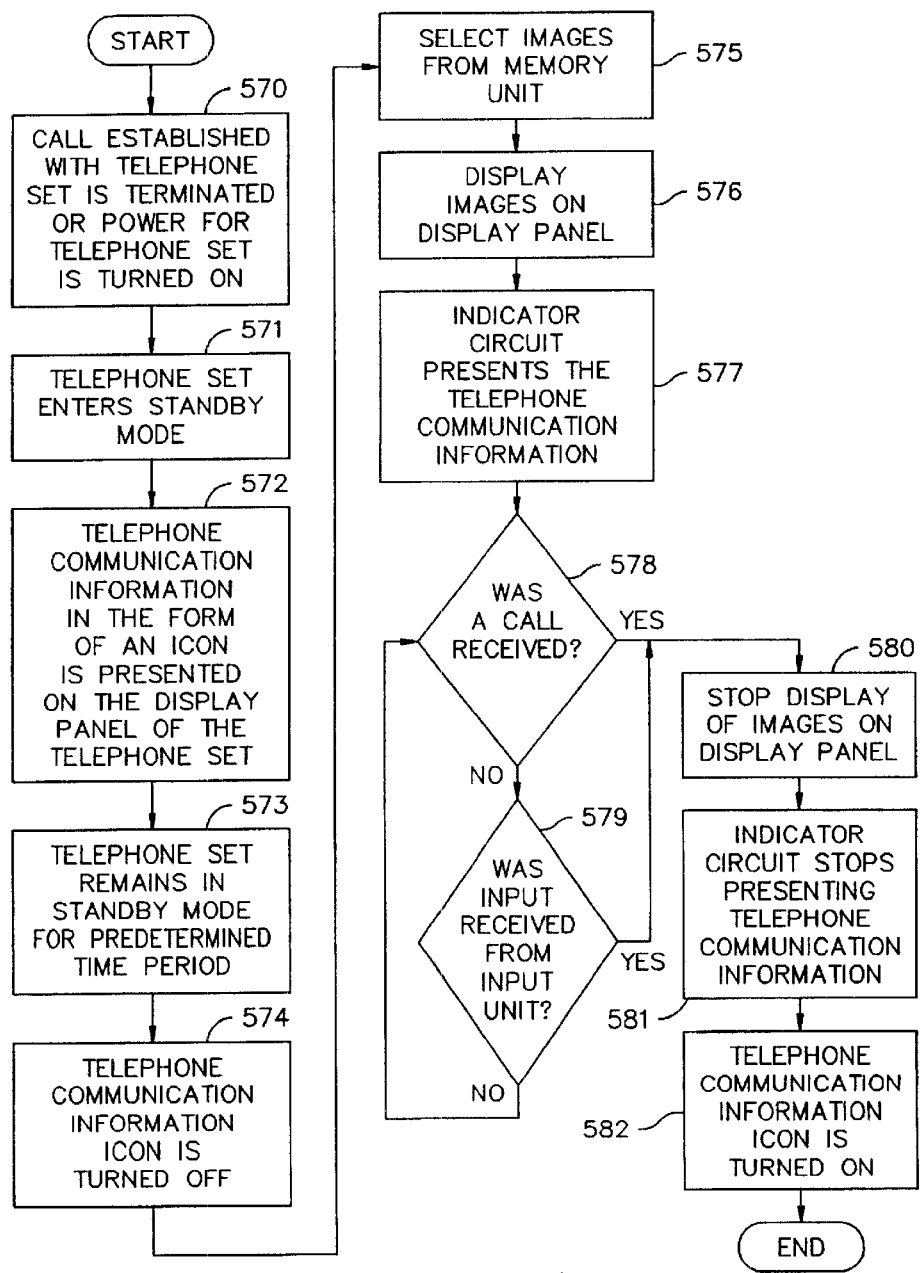
FIG. 15 is a flowchart illustrating the operation of the third embodiment of the invention.

Referring to FIG. 15, in step S70, either a call established with the telephone set is terminated (i.e., at the end of a call), or power for the telephone set is turned on. In response, the telephone set enters a standby mode (step S71). In step S72, telephone communication information in the form of an icon (antenna icon 32) is presented on the display panel 16 of the telephone set. In step S73, the telephone set remains in the standby mode for a predetermined period of time (e.g., five minutes) if a call is not received, and if input is not received from input unit 17. After the predetermined time period has elapsed, the telephone communication information icon 32 is turned off (step S74). In step S75, images stored in ROM (memory unit) 13 are selected by the control unit 12. The images are displayed on display panel 16 (step S76). In step S77, the LED indicator (indicator circuit) 30 presents the telephone communication information to indicate whether the telephone set is within range of a base station. When a call is received (step S78), or when input is received from input unit 17 (step S79), the control unit 12 automatically switches back from the image display to an information display that presents the telephone communication information (steps S80, S81 and S82).

Next, a fourth embodiment will be described.

Figure 12:
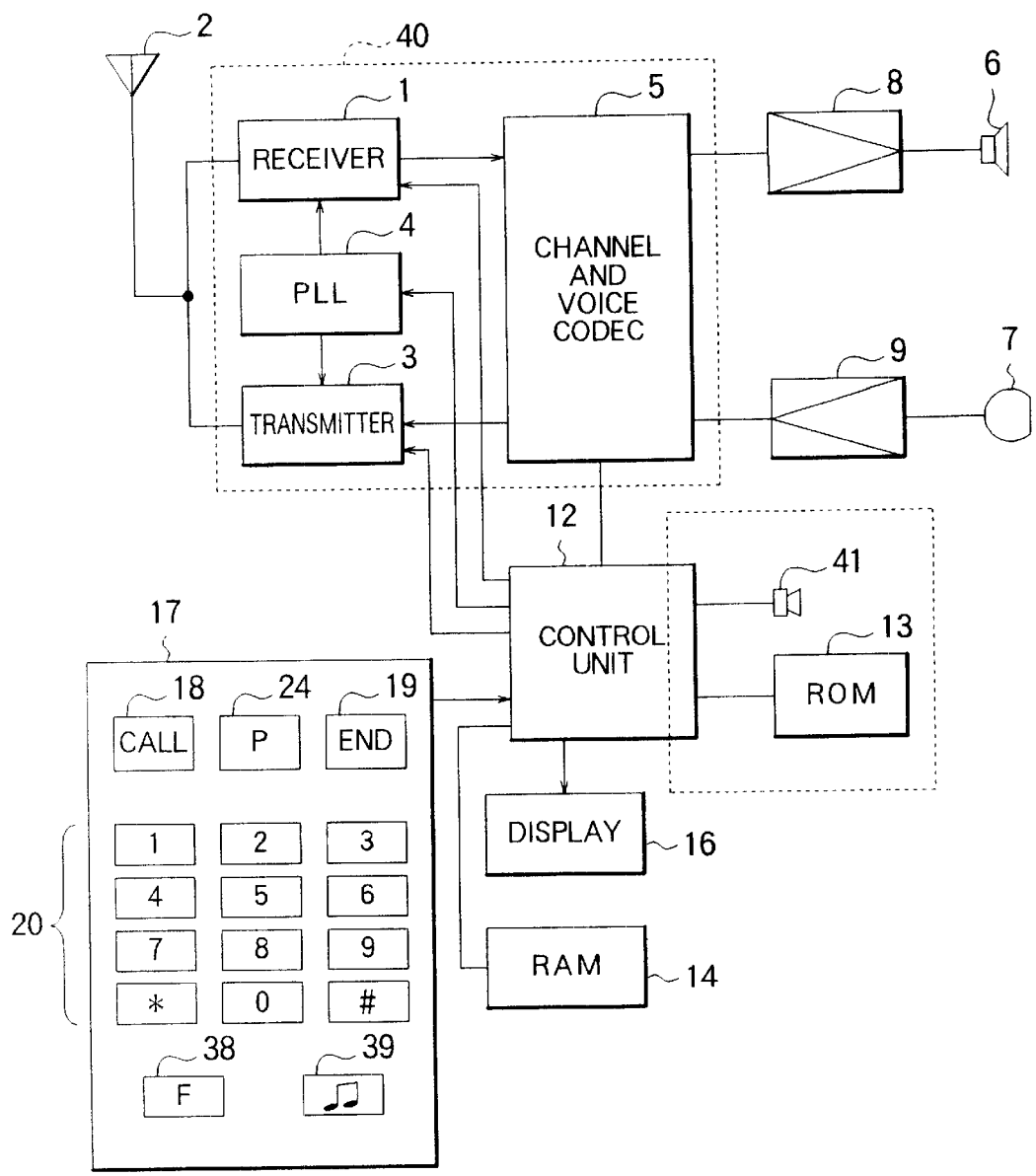
FIG. 12 is a block diagram illustrating a fourth embodiment of the invention.

Referring to FIG. 12, the fourth embodiment is a portable telephone set comprising a receiver 1, antenna 2, transmitter 3, PLL 4, channel and voice codec 5, loudspeaker 6, microphone 7, and amplifiers 8 and 9 as described above. The fourth embodiment also has a control unit 12 such as a microprocessor, which is coupled to a read-only memory (ROM) 13, a random-access memory (RAM) 14, a liquid-crystal display panel 16, and an input unit 17 with various keys and buttons, including a call button 18, an end button 19, a dial keypad 20, a power (P) on-off button 24, a function (F) button 38, and a hold melody button 39.

The receiver 1, transmitter 3, PLL 4, and channel and voice codec 5 will be referred to below as the communication circuits 40 of the telephone set.

The control unit 12 is also coupled to a sound generator 41. The control unit 12 includes a sound synthesis circuit (not visible) that synthesizes a variety of sound waveforms, using audio data stored in the ROM 13, the synthesized waveforms being reproduced as sound by the sound generator 41. The sound synthesis function of the control unit 12 may be partly implemented by software, which may be stored in the ROM 13 or in a separate memory integrated into the control unit 12. The sound synthesis circuit may also be external to the control unit 12. The ROM 13, the sound generator 41, and the sound synthesis circuit or function will be referred to below as the sound circuits 42 of the telephone set.

Next, the operation of the fourth embodiment will be described, starting from the standby state in which the telephone set's power is switched on and the telephone set is waiting to receive a call.

Figure 13:
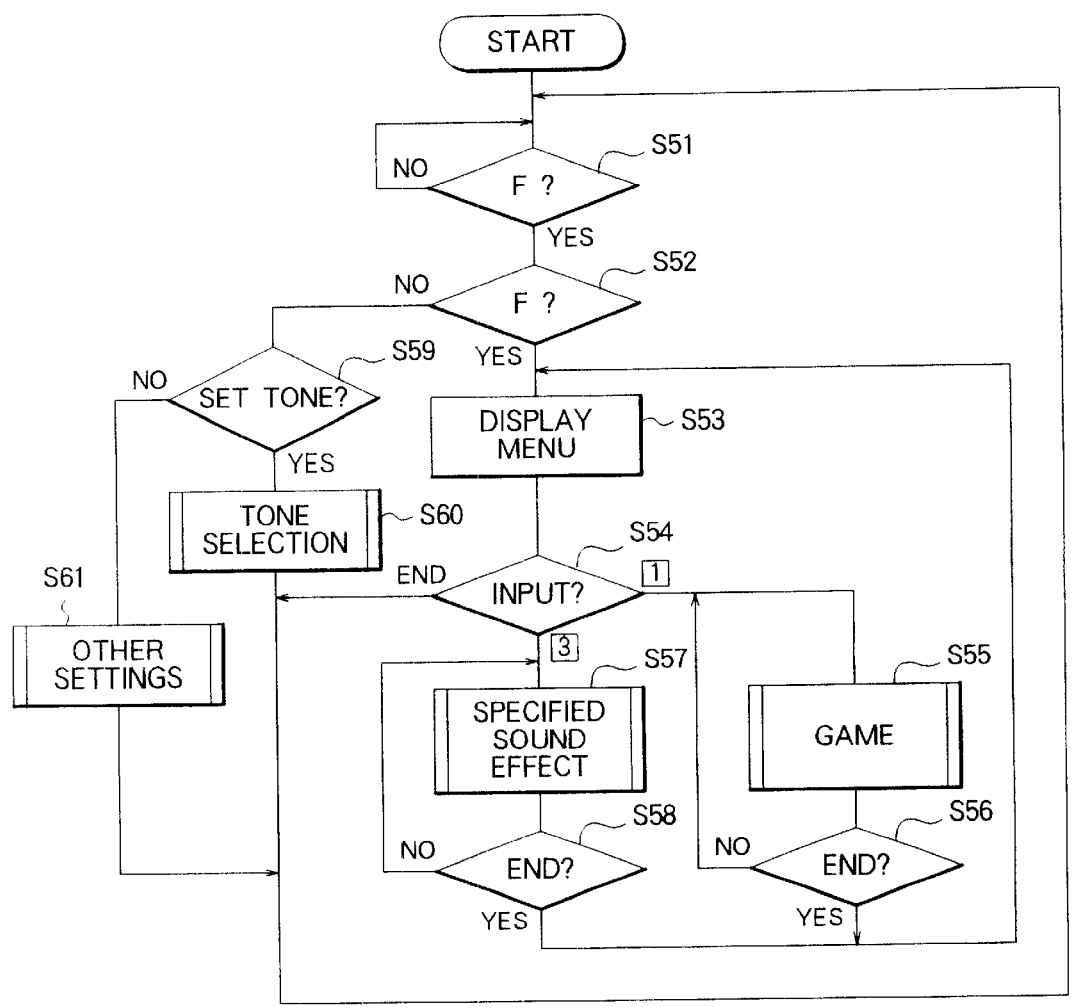
FIG. 13 is a flowchart illustrating the operation of the fourth embodiment.

Referring to FIG. 13, the control unit 12 monitors the function (F) button 38 (step S51). If the function button 38 is pressed, the control unit 12 enters a mode-input state and waits for the next button press (step S52). If the function button 38 is pressed again, the control unit 12 enters a toy mode and displays a mode menu on the display panel 16.

In the toy mode, the telephone set is employed not for communication, but as an amusement device for the entertainment of the user and his or her companions. The toy mode includes, for example, a game function and a sound-effects function or SFX function. The menu displayed on the display panel 16 in this case has, for example, the following appearance.

TOY MODE
1. GAME
3. SFX

After displaying the menu, the control unit 12 waits for the '1' digit key, the '3' digit key, or the end button 19 to be pressed (step S54). If the end button is pressed, the control unit 12 terminates mode input and returns to step S51.

If the '1' digit key is pressed, the control unit 12 starts a game on the display panel 16, preferably a game of the type in which the user tries to attain a maximum number of points within a limited time, as the limited time prevents undue battery drain. The user plays the game by pressing, for example, the dial keys 20. During the game, the control unit 12 monitors these keys and the end button 19 (step S56). If the user presses the end button 19 during the game, the control unit 12 terminates the game immediately and returns to the menu display (step S53). If the user does not terminate the game in this way, the control unit 12 returns to the menu display (step S53) at the end of the game.

If the user presses the '3' digit key while the menu is displayed, the control unit 12 monitors the end button 19 and dial keypad 20. If the user presses a digit key on the dial keypad 20, the control unit 12 reads corresponding sound waveform data from the ROM 13, and synthesizes a sound effect, which is produced through the sound generator 41 (step S57). The control unit 12 then continues to monitor the end button 19 and dial keypad 20 (step S58). If the user presses another digit key, the control unit 12 synthesizes another sound effect. If the user presses the end button 19, the control unit 12 returns to the menu display (step S53).

The sound effects include simulated vocal effects and various other non-musical sounds. For example, the control unit 12 synthesizes a discontented grumble if the user presses the '0' key, a comical laugh if the user presses the '1' key, and a roaring crowd noise if the use presses the '2' key. Comparatively short, startling sound effects are preferable. Other possible examples include a loud whistle, an angry exclamation, a sad sigh, and a ferocious yell.

If the user presses the end button while the menu is displayed, the control unit 12 terminates mode input and returns to step S51.

Mode input can also be used to make settings related to the communication function of the telephone, by pressing the function key 38 once, followed by a numeric code. One group of settings comprises tone and melody settings. For example, the user presses F13 to select an alarm tone, F80 to select a ringing tone, F15 to select a ringing tone announcing a call from a designated number, and F85 to select a hold melody. After recognizing the code input (steps S51 and S59), the control unit 12 presents a menu of available tones or melodies, from which the user makes a selection with the dial keys 20 (step S60). The selection of ringing tones includes both normal ringing tones and more distinctive tones or sound effects. The selection of hold melodies is restricted to musical melodies, and does not include any of the sound effects produced in the SFX mode.

Other groups of settings, not related to tones or melodies, are also provided, as in conventional portable telephone sets (step S61). Two tones that cannot be altered are the handover tone and the busy tone.

A feature of the fourth embodiment is that angry shouts and other sound effects are producible only for the amusement of the user and his or her companions. These sound effects cannot be transmitted through the communication circuits 40 to a distant party, because mode input is disabled while a call is in progress, and because during mode input, the call button 18 is not recognized, so the user cannot originate or answer a call. Thus there is no risk that a distant caller will be surprised by an unusual sound effect.

Similarly, the user can select unusual ringing tones to suit his or her preferences, but cannot transmit these unusual tones to the distant party during a call. During a call, the sound circuits 42 can be used only for restricted conventional operations, such as sending a hold melody. There is accordingly no temptation to use the sound circuits 42 to play pranks on the distant party in a telephone call.

By providing a special mode with games and sound effects, the fourth embodiment offers the user and his or her companions a means of entertainment during idle moments, thereby increasing the utility of the telephone set.

By disabling the use of this special mode during calls, the fourth embodiment prevents the distant party in a telephone conversation from being startled by unintended sound effects.

Similarly, the fourth embodiment prevents the sound effects from being used to make malicious or prank calls.

Figure 14:
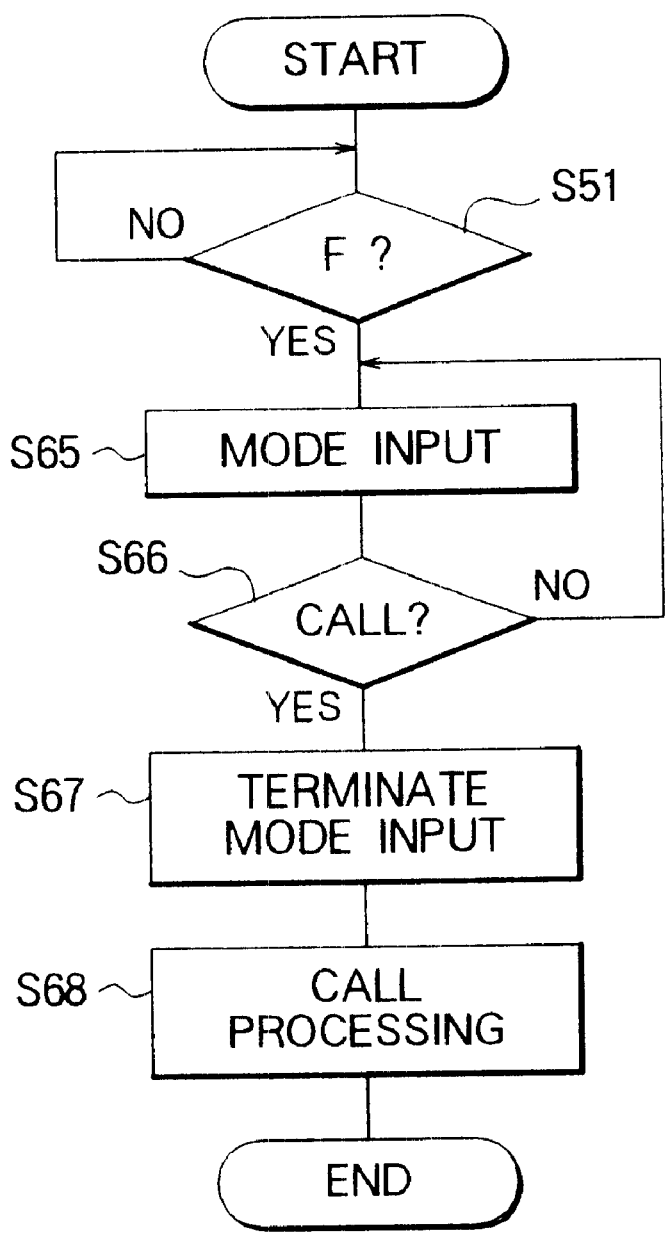
FIG. 14 is a flowchart illustrating the operation of a variation of the fourth embodiment.

In a variation of the fourth embodiment, the call button 18 is recognized during mode input, but pressing the call button immediately terminates mode input. Referring to FIG. 14, the control unit 12 monitors the function (F) key (step S51) as above, and enters the mode-input state (step S65) when the function key is pressed. During the mode-input state, the control unit 12 performs the operations described in FIG. 13, but also monitors the call button 18 (step S66). If the call button 18 is pressed, the control unit 12 immediately terminates the mode-input state (step S67) and begins call processing operations (step S68). As above, in the sound effects producible in the mode-input state cannot be used during calls.

In another variation of the fourth embodiment, the sound generator 41 is also coupled the channel and voice codec 5, and is used as a second loudspeaker during calls when the telephone set is not held close to the user's ear.

The invention is not limited to PHS telephone sets, but can be practiced to advantage in other types of wireless or cordless telephone sets, with suitable modifications to the channel and voice codec.

Variations of the embodiments have been mentioned above, but those skilled in the art will recognize that further variations are possible within the scope claimed below.

What is claimed is:

1. A telephone set having a receiving circuit, a display panel, and an input unit with manual controls, comprising:

a memory unit storing a plurality of images; and a control unit monitoring elapsed time and input from said input unit, said control unit selecting said images from said memory unit, displaying said images on said display panel, and automatically switching said display panel from displaying said images to displaying information when a call is received by said telephone set, wherein said images are automatically displayed after a predetermined time period has elapsed, during which said telephone set has entered and remained in a standby state waiting for a call to arrive, without an input from said input unit, and wherein, while displaying said images, said display panel also displays an indication of whether the telephone set is within communicable range of a base station.

2. A telephone set having a display panel, comprising:

a memory unit storing a plurality of images;

an indicator circuit operating independent of said display panel; and a control unit selecting said images from said memory unit, displaying said images on said display panel, and automatically switching said display panel from displaying said images to displaying information when a call is received by said telephone set, wherein telephone communication information is presented by said indicator circuit when said images are displayed, and said telephone communication information is presented by said display panel when said images are not displayed.

3. A telephone set having a display panel, comprising:

a memory unit storing a plurality of images;

an indicator circuit operating independent of said display panel; and a control unit selecting said images from said memory unit, displaying said images on said display panel, and automatically switching said display panel from displaying information to displaying said images a predetermined time after said telephone set enters a standby mode, wherein telephone communication information is presented by said indicator circuit when said images are displayed, and said telephone communication information is presented by said display panel when said images are not displayed.

4. In a telephone set having a display panel, a memory unit storing a plurality of images, and an indicator circuit operating independent of said display panel, a method comprising:

(a) selecting said images from said memory unit;

(b) displaying said images on said display panel;

(c) said indicator circuit presenting telephone communication information when said images are displayed on said display panel; and (d) said display panel presenting said telephone communication information when a call is received by said telephone set.

5. In a telephone set having a display panel, a memory unit storing a plurality of images, and an indicator circuit operating independent of said display panel, a method comprising:

(a) selecting said images from said memory unit;

(b) displaying said images on said display panel;

(c) said indicator circuit presenting telephone communication information a predetermined time after said telephone set enters a standby mode; and (d) said display panel presenting said telephone communication information when a call is received by said telephone set.

* * * * *